(12) United States Patent
Yamashita et al.

(10) Patent No.: US 6,572,227 B2
(45) Date of Patent: Jun. 3, 2003

(54) INK-JET RECORDING METHOD AND INK-JET RECORDING APPARATUS

(75) Inventors: Kunichi Yamashita, Minamiashigara (JP); Atsushi Suzuki, Minamiashigara (JP); Toshitake Yui, Minamiashigara (JP)

(73) Assignee: Fuji Zerox Co., Ltd., Tokyo (JP)

( * ) Notice: Subject to any disclaimer, the term of this patent is extended or adjusted under 35 U.S.C. 154(b) by 0 days.

(21) Appl. No.: 10/014,043

(22) Filed: Dec. 11, 2001

(65) Prior Publication Data
US 2003/0043245 A1 Mar. 6, 2003

(30) Foreign Application Priority Data
May 9, 2001 (JP) ........................................ 2001-138266

(51) Int. Cl.$^7$ .................................................. B41J 2/01
(52) U.S. Cl. ........................... 347/100; 347/96; 347/98; 347/101; 106/31.6
(58) Field of Search .......................... 347/100, 96, 101, 347/98; 106/31.27, 31.6, 31.13

(56) References Cited

U.S. PATENT DOCUMENTS

| | | | | |
|---|---|---|---|---|
| 5,844,583 A | * | 12/1998 | Onishi et al. | ................. 347/41 |
| 5,972,082 A | * | 10/1999 | Koyano et al. | .......... 106/31.27 |
| 6,422,676 B1 | | 7/2002 | Torgerson et al. | ............. 347/13 |

FOREIGN PATENT DOCUMENTS

| | | | | |
|---|---|---|---|---|
| JP | 6-116522 | | 4/1994 | |
| JP | 07-305012 | * | 11/1995 | .............. B41J/2/01 |
| JP | 10-287837 | | 10/1998 | |
| JP | 2000-144028 | * | 5/2000 | .............. B41J/2/01 |
| JP | 2000-290556 | * | 10/2000 | .............. B41J/2/01 |

* cited by examiner

Primary Examiner—Lamson Nguyen
Assistant Examiner—Manish Shah
(74) Attorney, Agent, or Firm—McCormick, Paulding & Huber LLP

(57) ABSTRACT

The ink-jet recording method and apparatus use an ink containing at least, a pigment self-dispersible in water, a water soluble organic solvent and water, and carry out printing with an amount of the ink of 20 ng or less per one droplet, and the ink satisfies the following conditions: a dynamic contact angle upon dropping 4 $\mu$L of the ink on plain paper is about 60° or less after one second from dropping; a volume average particle diameter mv of dispersed particles of the pigment in the ink is about from 150 to 250 nm; and in the dispersed particles, a number of particles having a particle diameter of from 0.5 to 5 $\mu$m is about from 25×10$^4$ to 2,000×10$^4$ per microliter, and a number of particles having a particle diameter of 5 $\mu$m or more is about 100 per microliter or less.

25 Claims, No Drawings

INK-JET RECORDING METHOD AND INK-JET RECORDING APPARATUS

BACKGROUND OF THE INVENTION

1. Field of the Invention

The present invention relates to an ink-jet recording method, in which an image is recorded by ejecting an ink from a nozzle, and an apparatus for ink-jet recording.

2. Description of the Related Art

The fundamental of the ink-jet recording method is that a liquid or molten solid ink is ejected from a nozzle, a slit or a porous film to carry out recording on a recording material, such as paper, cloth or a film. The ink-jet recording method has such advantages that an apparatus therefor is small and inexpensive and is excellent in quietness, and monochrome printers for black color and full color printers are widely available on commercial base. Among these, a so-called piezo ink-jet method using a piezoelectric device and a thermal ink-jet method carrying out recording by forming droplets by acting thermal energy have large number of advantages, such as high speed printing and high resolution.

An ink used in the ink-jet recording apparatus is demanded to have the following characteristics:

(1) A uniform image having high resolution and high density can be obtained on paper without causing bleeding and fogging.

(2) Clogging due to drying of the ink does not occur at a tip end of the nozzle, and the ejection responsiveness and the ejection stability are good at all times.

(3) The drying property of the ink in the form of an image is high.

(4) The resulting image is excellent in durability.

(5) The long-term storage stability is high.

The drying property of the ink on a recording material is being important associated with speeding up of the ink-jet recording system. In order to realize the drying property, for example, Japanese Patent Laid-Open No. 116522/1994 discloses an ink containing a pigment, a water soluble resin and an acetylene glycol series surfactant, and Japanese Patent Laid-Open No. 287837/1998 discloses an ink containing a self-dispersible pigment and an acetylene glycol series surfactant. These techniques realize excellent dry property by adding to an ink a substance imparting permeability to paper.

However, in the case where the permeability imparting substance is added to an ink, blue occurs at an edge part of a letter, a line and a solid image, and thus sufficient image quality is difficult to be obtained. Furthermore, a large amount of a colorant is permeated in paper to cause such a problem that the optical density of the image is reduced.

In order to prevent the reduction of the optical density of the image, it can be easily expected to increase the concentration of the colorant in the ink. However, in the case where the colorant concentration in the ink is increased, and a dye is used as the colorant, sufficient performance cannot be obtained for water resistance and light resistance although a high optical density can be obtained. In the case where a pigment excellent in light resistance and water resistance is used as the colorant, such problems occur that (1) clogging is liable to occur with the ink at the tip end of the nozzle of the ink-jet recording apparatus, and (2) the optical density is widely fluctuated depending on the species of paper, and there are some kinds of paper that suffer large decrease in density. Therefore, it is practically difficult to use as an ink for the ink-jet recording method.

The reasons of the problems are considered as follows. With respect to the problem (1), because the pigment is insoluble in water, the dispersion stability of the pigment in the ink is liable to be broken when water in the ink is evaporated at the tip end of the nozzle, whereby the ink is liable to clog the tip end of the nozzle. With respect to the problem (2), because species and amount of a surface additive and the state of entanglement of fibers are largely different depending on the kind of paper, the colorant does not remain on the surface of the paper but is excessively penetrated into the paper in some cases depending on the combination of the aggregation rate and the aggregated state of the pigment in the ink the paper with the paper characteristics. The fluctuation in density among the kinds of paper is peculiar in the case where a pigment is used as the colorant, but an ink using a dye as the colorant does not cause severe problems in fluctuation of density although the problems described in the foregoing occur. It is considered that this is because in the case of the dye ink, the colorant itself dyes the surface of paper.

SUMMARY OF THE INVENTION

Therefore, the invention is to provide an ink-jet recording method and an apparatus for ink-jet recording in that bleeding at an edge part does not occur, sufficient water resistance and light resistance are attained, an image that is excellent in fixing property and has small fluctuation in optical density depending on paper can be obtained, and by using an ink for ink-jet recording that is difficult to cause clogging due to drying of the ink for ink-jet recording at a tip end of a nozzle, various characteristics that are demanded in a resulting recorded image are balanced on a higher level.

As a result of various earnest investigations by the inventors, it has been found that according to an ink-jet recording method using an ink for ink-jet recording that satisfies the characteristics described later, such an image can be obtained that is excellent in drying property on plain paper, has a sufficient optical density on plain paper, exhibits less fluctuation in optical density depending on paper, has sufficient water resistance and light resistance, causes less blue at edge parts of a line, a letter and a solid image, and is excellent in fixing property. Thus, the invention has been completed.

The invention relates to, as one aspect, an ink-jet recording method using an ink for ink-jet recording containing at least, as essential components, a pigment self-dispersible in water, a water soluble organic solvent and water, and carrying out printing with an amount of the ink of 20 ng or less per one droplet, the ink for ink-jet recording satisfying the following conditions (a) to (c):

(a) a dynamic contact angle upon dropping 4 $\mu$L of the ink for ink-jet recording on plain paper is about 60° or less after one second from dropping;

(b) a volume average particle diameter mv of dispersed particles of the pigment in the ink for ink-jet recording is about from 150 nm to 250 nm; and (c) in the dispersed particles of the pigment in the ink for ink-jet recording, number of particles having a particle diameter of from 0.5 $\mu$m to 5 $\mu$m is about from $25 \times 10^4$ to $2,000 \times 10^4$ per microlitter, and a number of particles having a particle diameter of 5 $\mu$m or more is about 100 per microlitter or less.

In the ink-jet recording method of the invention, it is possible that the dynamic contact angle upon dropping 4 $\mu$L of the ink for ink-jet recording on plain paper is about 50° or less after one second from dropping.

In the ink-jet recording method of the invention, it is possible that a concentration of the pigment in the ink for ink-jet recording is about from 3% to 20% by mass.

In the ink-jet recording method of the invention, it is possible that a ratio of the volume average particle diameter mv to a number average particle diameter mn (mv/mn) of the dispersed particles of the pigment in the ink for ink-jet recording is about 3.2 or less.

In the ink-jet recording method of the invention, it is possible that printing of droplets of the ink is carried out at a driving frequency of about 15 KHz or more.

In the ink-jet recording method of the invention, it is possible that the ink for ink-jet recording further contains a nonionic surfactant.

In the ink-jet recording method of the invention, it is possible that the ink for ink-jet recording further contains a dye.

The invention relates to, as another aspect, an apparatus for ink-jet recording containing a transporting unit for transporting a recording material, an ink-jet recording head recording an image on the recording material transported by the transporting unit by ejecting an ink at an amount of the ink of 20 ng or less per one droplet, and an image signal input unit for inputting an image signal to the ink-jet recording head, the ink containing at least, as essential components, a pigment self-dispersible in water, a water soluble organic solvent and water, and satisfying the following conditions (a) to (c):

(a) a dynamic contact angle upon dropping 4 $\mu$L of the ink for ink-jet recording on plain paper is about 60° or less after one second from dropping;

(b) a volume average particle diameter mv of dispersed particles of the pigment in the ink for ink-jet recording is about from 150 nm to 250 nm; and (c) in the dispersed particles of the pigment in the ink for ink-jet recording, a number of particles having a particle diameter of from 0.5 $\mu$m to 5 $\mu$m is about from $50 \times 10^4$ to $2,000 \times 10^4$ per microlitter, and a number of particles having a particle diameter of 5 $\mu$m or more is about 100 per microlitter of less.

In the apparatus for ink-jet recording of the invention, it is possible that the dynamic contact angle upon dropping 4 $\mu$L of the ink for ink-jet recording on plain paper is about 50° or less after one second from dropping.

In the apparatus for ink-jet recording of the invention, it is possible that a concentration of the pigment in the ink for ink-jet recording is about from 3% to 20% by mass.

In the apparatus for ink-jet recording of the invention, it is possible that a ratio of the volume average particle diameter mv to a number average particle diameter mn (mv/mn) of the dispersed particles of the pigment in the ink for ink-jet recording is about 3.2 or less.

In the apparatus for ink-jet recording of the invention, it is possible that printing of droplets of the ink is carried out at a driving frequency of about 15 KHz or more.

In the apparatus for ink-jet recording of the invention, it is possible that the ink for ink-jet recording further contains a nonionic surfactant.

In the apparatus for ink-jet recording of the invention, it is possible that the ink for ink-jet recording further contains a dye.

DESCRIPTION OF THE PREFERRED EMBODIMENTS

The invention will be described in detail below.
Ink-jet Recording Method

In the ink-jet recording method according to the invention, recording and printing are carried out by using a particular ink for ink-jet recording (hereinafter sometimes simply referred to as an "ink") with an appropriate amount of the ink per one droplet. The ink, which is one of the particular features of the invention, will be described in detail herein, and then the recording and printing method will be described.
Ink for Ink-jet Recording The ink in the invention contains at least, as essential component, a pigment self-dispersible in water, a water soluble organic solvent and water.

The self-dispersible pigment used as a colorant in the ink in the invention is such a pigment that preferably has a hydrophilic functional group on a surface thereof, contains no so-called polymer dispersant, and is dispersible by itself in a solvent.

In the invention, the definition as to whether or not the pigment is "self-dispersible" is confirmed by the following self-dispersibility test.
Self-Dispersibility Test A pigment to be measured is added to water and dispersed without any dispersant by using, for example, an ultrasonic homogenizer, a nanomizer, a microfluidizer or a ball mill, followed by diluting with water to make an initial pigment concentration of about 5% by mass, so as to prepare a dispersion. The initial pigment concentration is measured, and a pigment concentration of an upper layer obtained after allowing 100 g of the dispersion to stand in a glass bottle having a diameter of 40 mm for one day (a pigment concentration of a dispersion at a depth of 10% from the surface of the dispersion in the vertical direction of the dispersion) is also measured. In the case where a ratio of the pigment concentration after allowing one day to the initial pigment concentration (hereinafter referred to as a "self-dispersibility index") is 98% or more, the pigment is evaluated as being "self-dispersible".

The measurement method for the pigment concentration herein is not particularly limited and may be a method, in which a sample is dried, and a resulting solid content is measured, and a method, in which a sample is diluted to a suitable concentration, and a transmittance thereof is then measured. Any other method than the foregoing can also be employed as far as it can provide an accurate pigment concentration.

The hydrophilic functional group contained in the pigment may be either nonionic, anionic or cationic hydrophilic group, and a carboxyl group, a hydroxyl group, a sulfonic group, a phosphoric group and a combination of two or more of them are preferred, with a carboxyl group and a combination of two of more of them containing a carboxyl group being more preferred.

In the case where a carboxyl group, a sulfonic group or a phosphoric group is contained, they may be contained in the form of a free acid, and it is preferred that the entire or part thereof forms a salt from the standpoint of dispersibility. Examples of a substance forming the salt include various kinds of basic substances, and an alkali metal, ammonia, an organic onium compound and a combination of two or more of them are preferred. The number of the hydrophilic groups on the surface of the pigment varies depending on the kind of the hydrophilic group and the kind of the substance forming a salt when a salt is formed, and cannot be determined unconditionally. For example, the number of the hydrophilic group is preferably from 0.8 mmol/g to 4 mmol/g in the case of —COONa.

The pigment, to which the hydrophilic functional group, may be either an inorganic pigment or an organic pigment. As a black pigment, carbon black, such as furnace black, lamp black, acetylene black and channel black, is preferred, and examples thereof include Raven 7000, Raven 5750, Raven 5250, Raven 5000 ULTRA II, Raven 3500, Raven 2500 ULTRA, Raven 2000, Raven 1500, Raven 1250, Raven 1200, Raven 1190 ULTRA II, Raven 1170, Raven 1255, Raven 1080 ULTRA, Raven 1060 ULTRA, Raven 790 ULTRA, Raven 780 ULTRA, Raven 760 ULTRA (all produced by Columbian Chemical Company), Regal400R, Regal330R, Regal660R, Mogul L, Black Pearls L, Black Pearls 1300, Monarch 700, Monarch 800, Monarch 880, Monarch 900, Monarch 1000, Monarch 1100, Monarch 1300, Monarch 1400 (all produced by Cabot Oil & Gas Corp.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all produced by Degussa Corp.), No. 25, No. 33, No. 40, No. 47, No. 52, No. 900, No. 2300, MCF-88, MA600, MA7, MA8 and MA100 (all produced by Mitsubishi Chemical Co., Ltd.), but the invention is not limited to them. Magnetic fine particles, such as magnetite and ferrite, and titanium black may be used as the black pigment.

Examples of a cyan pigment include C.I. Pigment Blue 1, C.I. Pigment Blue 2, C.I. Pigment Blue 3, C.I. Pigment Blue 15, C.I. Pigment Blue 15:1, C.I. Pigment Blue 15:3, C.I. Pigment Blue 15:34, C.I. Pigment Blue 16, C.I. Pigment Blue 22 and C.I. Pigment Blue 60, but the invention is not limited to them.

Examples of a magenta pigment include C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184 and C.I. Pigment Red 202, but the invention is not limited to them.

Examples of a yellow pigment include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151 and C.I. Pigment Yellow 154, but the invention is not limited to them.

Pigments that are produced afresh for the invention may be used, and two or more kinds of pigments may be used as a mixture.

In addition to the pigments of black color and the three primary colors, i.e., cyan, magenta and yellow, a pigment of a particular color, such as red, green, blue, brown and white, a metallic gloss pigment, such as gold and silver colors, a colorless body pigment, and a plastic pigment may be used. What is particularly preferred as the pigment is carbon black.

As a method for introducing the hydrophilic group to the surface of the pigment, any known method and a method developed afresh for the invention may be used. Examples thereof include an oxidation treatment by an oxidizing agent (such as nitric acid, a permanganate, a bichromate, a hypochlorite, ammonium persulfate, hydrogen peroxide and ozone), a treatment with a coupling agent, such as a silane compound, a polymer grafting treatment, a plasma treatment, a novel method developed afresh for the invention, and a combination of them.

The resulting pigment having a hydrophilic group introduced is preferably purified by removing an impurity, such as the oxidizing agent remaining, and other inorganic and organic impurities. In particular, it is preferred that the contents of calcium, iron and silicon in the ink are 10 ppm or less, respectively, and more preferably 5 ppm or less, respectively. In the invention, the contents of the inorganic impurities are measured by high frequency wave induction coupling plasma emission spectrometry. The removal of the impurities can be carried out, for example, by such a method as water washing, reverse osmosis, ultrafiltration and ionic exchange, a method of adsorption by using activated carbon or zeolite, and a combination of these methods.

As the self-dispersible pigment having a hydrophilic group introduced, commercially available self-dispersible hydrophilic pigments may be used, as well as those produced afresh for the invention. Examples of the commercially available self-dispersible hydrophilic pigment include MICROJET BLACK CW-1 (produced by Orient Chemical Co., Ltd.), MICROJET BLACK CW-2 (produced by Orient Chemical Co., Ltd.), CAB-O-JET 200 (produced by Cabot Oil & Gas Corp.) and CAB-O-JET 300 (produced by Cabot Oil & Gas Corp.). These commercially available self-dispersible hydrophilic pigments have a self-dispersibility index of 100%).

It is preferred that the self-dispersible pigment (hereinafter sometime simply referred as a "pigment") is contained in the ink in an amount of about from 3% to 20% by mass based on the total amount of the ink (the condition (b) in the invention), more preferably from 5% to 15% by mass, and particularly preferably from 7% to 10% by mass. When the content of the pigment exceeds 20% by mass, clogging at the tip end of the nozzle is liable to occur, and the abrasion resistance of the image tends to be deteriorated. When the content is less than 3% by mass, a sufficient optical density sometimes cannot be obtained, and fluctuation in optical density depending on paper is liable to be increased.

It is necessary that the volume average particle diameter mv of dispersed particles of the pigment in the ink is about from 150 nm to 250 nm (the condition (b) in the invention), and preferably it is adjusted to a range of from 150 nm to 200 nm. When the volume average particle diameter mv is less than 150 nm, there are tendencies that the optical density is decreased, fluctuation in density depending on paper is increased, and clogging at the tip end of the nozzle is liable to occur. When the volume average particle diameter mv exceeds 250 nm, clogging at the tip end of the nozzle is liable to occur.

The particle size distribution mv/mn expressed by the ratio of the volume average particle diameter mv to a number average particle diameter mn of the dispersed particles of the pigment in the ink is preferably about 3.2 or less, more preferably 3 or less, and particularly preferably 2.5 or less. When the particle size distribution mv/mn is broadened, there are tendencies that the penetration rate is decreased, and the abrasion resistance is lowered. Particularly, in the case where carbon black having been subjected to a hydrophilic treatment is used as the self-dispersible pigment, the particle size distribution is preferably 2.2 or less from the standpoint of the abrasion resistance of the image. The particle size distribution mv/mn becomes 1 in the case of the monodisperse state, and the particle size distribution is ideally desired to be approximated to the monodisperse state. However, the monodisperse state where the particle size distribution mv/mn=1 is difficult to be realized, and it is generally a value of 1.1 or more.

The measurement of the particle diameter of the dispersed particles of the pigment is carried out by using Microtrack UPA Particle Size Meter 9340 (produced by Leeds & Northrup Company). The measurement is carried out for the state where the ink having the pigment dispersed therein to be measured (hereinafter referred to a "measured ink") is diluted 1,000 times. As for the parameters input upon measurement, the viscosity is the viscosity of water, and the density of dispersed particles is the density of the pigment. The density, as the later parameter, is 1.8 g/cm$^2$ in the case of hydrophilic carbon black as the pigment.

In the dispersed particles of the pigment in the ink of the invention, a number of particles having a particle diameter of from 0.5 $\mu$m to 5 $\mu$m is about from $25 \times 10^4$ to $2,000 \times 10^4$ per microlitter, and a number of particles having a particle diameter of 5 $\mu$m or more is about 100 per microlitter or less (the condition (c) in the invention).

In the dispersed particles of the pigment contained in 1 $\mu$L of the ink, when the number of particles having a particle diameter of from 0.5 $\mu$m to 5 $\mu$m is less than about $25 \times 10^4$, a sufficient optical density cannot be obtained in a solid image part, and fluctuation in density depending on paper is increased. When it exceeds about $2,000 \times 10^4$, clogging at the tip end of the nozzle occurs, and the fixing property is deteriorated. The number of particles falling within the range of from 0.5 $\mu$m to 5 $\mu$m is preferably adjusted to a range of from $50 \times 10^4$ to $2000 \times 10^4$ per microlitter.

In the dispersed particles of the pigment contained in 1 $\mu$L of the ink, when the number of particles having a particle diameter of 5 $\mu$m or more exceeds about 100, clogging occurs at the tip end of the nozzle. The number of the particles having a diameter of 5 $\mu$m or more is preferably adjusted to 50 or less per microlitter.

The number of particles falling within the range of from 0.5 $\mu$m to 5 $\mu$m and the number of particles falling within the range of 5 $\mu$m or more can be measured by using Accusizer TM770 Optical Particle Sizer (produced by Particle Sizing Systems Inc.) as a measuring equipment. The equipment is to measure particles passing the measuring part thereof by an optical technique. The measurement is carried out by putting 2 $\mu$L of the measured ink in a measuring cell and according to the prescribed measuring method of the equipment, and the measured value is converted to a value per 1 $\mu$L.

In order that the condition of the dispersed particles of the pigment in the ink of the invention is rendered the condition defined in the invention or the preferred condition in the invention, the following methods (1) to (4), for example, may be employed.

(1) Adjusting with Filter

The ink obtained by dispersing the pigment is passed through a filter to adjust the upper limit of the particle diameter of the dispersed particles of the pigment. The particle diameter of the dispersed particles of the pigment can be arbitrarily adjusted in such a manner that plural filters are used to classify the pigment into those passed through the filters and those not passed through the filters, and they are appropriately selected.

(2) Adding Component Changing Dispersed State

The particle diameter of the dispersed particles of the pigment can also be controlled by adding a component that changes the dispersed state of the dispersed particles of the pigment in the ink. That is, the particle diameter of the dispersed particles of the pigment can be increased in some extent by changing the electric conditions on the surface of the dispersed particles of the pigment to accelerate association of the dispersed particles of the pigment. At this time, when the association of the dispersed particles of the pigment proceeds to cause "aggregation" the condition greatly deviates from the dispersed state defined in the invention, and therefore, so-called aggregating agents are not preferred as the component changing the dispersed state of the dispersed particles of the pigment.

As the component changing the dispersed state of the dispersed particles of the pigment, a monovalent salt is preferred, and examples thereof include potassium chloride and sodium chloride. The addition amount thereof cannot be determined unconditionally because it should be arbitrarily adjusted depending on the composition of the ink, the original dispersed state of the dispersed particles of the pigment, the species of the pigment, and the species of the component to be added. When the component is added in a too large amount, the durability of the head upon continuous printing for a long period of time is liable to be deteriorated, and therefore the addition amount is preferably 1.0% by mass or less, and more preferably 0.8% by mass or less, based on the total weight of the ink.

(3) Selecting Pigment to Be Dispersed

The dispersed state of the dispersed particles of the pigment can be adjusted by controlling the original particle diameter of the pigment to be dispersed to a suitable value. For example, pigment particles having a somewhat larger size are difficult to be associated in a dispersed state, and they are liable to be present as primary particles or as associated bodies of fewer particles. Therefore, the dispersed state of the dispersed particles of the pigment can be adjusted by selecting the pigment to be dispersed having a suitable particle diameter.

(4) Adjusting by Centrifugal Separation

The dispersed state can be changed by the presence or absence of centrifugal separation step upon production of the ink or by appropriately controlling the conditions for the centrifugal separation.

While the four methods (1) to (4) are exemplified as the adjusting method of the dispersed state of the dispersed particles of the pigment, the invention is not limited to them, but it is sufficient that the dispersion state defined in the invention is finally obtained by using combinations of the methods (1) to (4) or other methods or by using combinations of all of these methods.

It is preferred that a dye ink is mixed in the ink of the invention as a colorant in addition to the pigment self-dispersible in water. When a dye ink is mixed, the fluctuation in optical density depending on paper can be reduced, and uniformity of a solid image part can be further improved. In this case, the addition amount of the dye is preferably 3% by mass or less, and more preferably 2% by weight or less, based on the total weight of the ink. When the addition amount of the dye exceeds 3% by mass, there are some cases where the water resistance is deteriorated.

The dye to be mixed is not particularly limited and is preferably a water soluble dye. Examples of the water soluble dye include an acidic dye and a direct dye, such as C.I. Direct Black 2, 4, 9, 11, 17, 19, 22, 32, 80, 151, 154, 168, 171, 194 and 195, C.I. Food Black 1 and 2, C.I. Acid Black 1, 2, 7, 16, 24, 26, 28, 31, 48, 52, 63, 107, 112, 118, 119, 121, 156, 172, 194 and 208, C.I. Direct Blue 1, 2, 6, 8, 22, 34, 70, 71, 76, 78, 86, 112, 142, 165, 199, 200, 201, 202, 203, 207, 218, 236, 287 and 307, C.I. Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189 and 227, C.I. Direct Violet 2, 5, 9, 12, 18, 25, 37, 43, 66, 72, 76, 84, 92 and 107, C.I. Direct Yellow 1, 2, 4, 8, 11, 12, 26, 27, 28, 33, 34, 41, 44, 48, 58, 86, 87, 88, 132, 135, 142, 144 and 173, C.I. Acid Red 1, 4, 8, 13, 14, 15, 18, 21, 26, 35, 37, 52, 110, 144, 180, 249 and 257, C.I. Acid Yellow 1, 3, 4, 7, 11, 12, 13, 14, 18, 19, 23, 25, 34, 38, 41, 42, 44, 53, 55, 61, 71, 76, 78, 79 and 122, and dyes having structures represented by the following general formulae (I) and (II), but the invention is not limited to them.

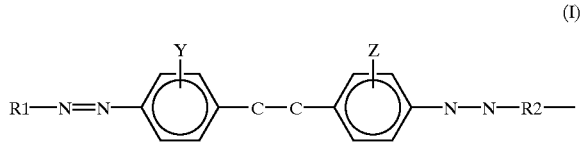

(I)

In the general formula (I), $R^1$ and $R^2$ each independently represents a group represented by the following general formula (1) or (2), and Y and Z each independently represents a hydrogen atom or —$SO_3M$, wherein M represents a counter ion, which is an ion selected from the group consisting of an alkali metal ion (such as Li, K and Na), an ammonium ion and a substituted ammonium ion.

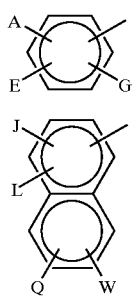

(1)

(2)

wherein A, E and G each independently represents a group selected from the group consisting of a hydrogen atom, an alkyl group (preferably having from 1 to 4 carbon atoms), —OH and —COOM, and J, L, Q and W each independently represents a group selected from the group consisting of a hydrogen atom, —OH, —$NH_2$ and —$SO_3M$, wherein M represents a counter ion, which is an ion selected from the group consisting of an alkali metal ion (such as Li, K and Na), an ammonium ion and a substituted ammonium ion.

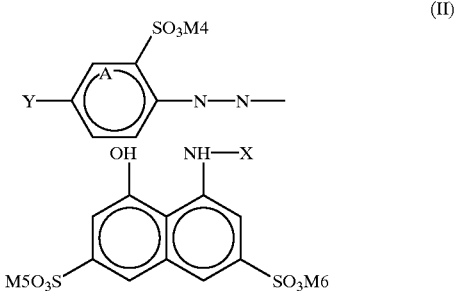

(II)

In the general formula (II), Y represents a hydrogen atom, a methyl group, a methoxy group, an acetylamino group or a nitro group and may form a benzene ring with the carbon atom at the 3-position of the benzene ring A, X represents an acetyl group, a benzoyl group, a p-toluenesulfoniyl group or a 4-chloro-6-hydroxy-1,3,5-triazine-2-yl group, and $M^4$, $M^5$ and $M^6$ each independently represents a counter ion, which is a base selected from the group consisting of an alkali metal (such as Li, K and Na) and an ammonium salt.

Particularly preferred dyes are C.I. Food Black 2, and C.I. Direct Black 154, 168 and 195.

Examples of the water soluble organic solvent used in the ink in the invention include a polyhydric alcohol, such as ethylene glycol, diethylene glycol, propylene glycol, butylene glycol, triethylene glycol, 1,5-pendanediol, 1,2,6-hexanetriol and glycerin; a polyhydric alcohol derivative, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether and an ethyleneoxide adduct of diglycerin; a nitrogen-containing solvent, such as pyrrolidone, N-methyl-2-pyrrolidone, cyclohexylpyrrolidone and triethanolamine; an alcohol, such as ethanol, isopropyl alcohol, butyl alcohol and benzyl alcohol; a sulfur-containing solvent, such as thiodiethanol, thiodiglycerol, sulfolane dimethylsulfoxide; and propylene carbonate and ethylene carbonate.

The water soluble organic solvent used in the invention may be used solely or as a mixture of two or more kinds of them. The content of the water soluble organic solvent is preferably from 1 to 50% by mass, more preferably from 15 to 40% by mass, and particularly preferably from 25 to 40% by mass, based on the total weight of the ink. When the content is less than 1% by mass, there are some cases where the moisturizing effect cannot be obtained. When it exceeds 50% by mass, there are some cases where ejection failure is induced due to the increased viscosity of the ink.

Furthermore, it is preferred that sulfolane as an organic solvent is contained in an amount of 5% by mass or more. In the case where sulfolane is contained in an amount of 5% by mass or more, there is observed an effect of improvement of clogging of the nozzle with the ink.

It is necessary that the ink in the invention has a dynamic contact angle upon dropping 4 μL of the ink for ink-jet recording on plain paper of about 60° or less after one second from dropping (the condition (a) in the invention), and preferably 50° or less. When the dynamic contact angle exceeds about 60°, there occurs paper that does not provide the sufficient drying property, and also the fixing property is liable to be deteriorated.

The dynamic contact angle of the ink herein means a so-called contact angle after a prescribed period of time from dropping the ink on plain paper, i.e., an angle between the surface of the ink droplet and the paper at the contact point of the ink droplet and the plain paper. When the ink droplet is completely penetrated into the plain paper, the dynamic contact angle is 0°. The dynamic contact angle referred in the invention is an angle after one second from dropping 4 μL of the ink on plain paper under the conditions of 23° C., 55%RH. The dynamic contact angle can be measured, for example, by using a dynamic contact angle meter, FIBRO 1100 DAT.

The plain paper used for measuring the dynamic contact angle in the invention is P Paper produced by Fuji Xerox Co., Ltd. as a representative. P Paper produced by Fuji Xerox Co., Ltd. is used as the representative because the paper is widely available on commercial base as copying paper, and exhibits average permeability with inks among various kinds of paper that is generally called as plain paper, whereby it is suitable for measuring the dynamic contact angle.

In the case where the dynamic contact angle measured by using P Paper as the plain paper is about 60° or less (preferably 50° or less), sufficient drying property and fixing property can be assured for all other kinds of plain paper, and it is more preferred that the condition of the dynamic contact angle is satisfied with respect to paper that is actually used.

In order to adjust the dynamic contact angle, the ink may contain various kinds of know permeable solvents and surfactants.

Particularly preferred examples of the permeable solvent include ethylene glycol monomethyl ether, ethylene glycol monoethyl ether, ethylene glycol monobutyl ether, diethylene glycol monomethyl ether, diethylene glycol monoethyl ether and diethylene glycol monobutyl ether.

The surfactant may be ether nonionic, anionic, cationic or amphoteric surfactant. In order to suppress mutual action with the hydrophilic functional group of the self-dispersible pigment and the ionic nature of a water soluble polymer, an ionic or nonionic surfactant that is of the same kinds as them is preferred, and a nonionic surfactant is particularly preferred.

Examples of the nonionic surfactant include polyoxyethylene nonylphenyl ether, polyoxyethylene octylphenyl ether, polyoxyethylene dodecylphenyl ether, a polyoxyethylene alkyl ether, a polyoxyethylene fatty acid ester, sorbitan fatty acid ester, a polyoxyethylene-polyoxypropylene block copolymer, a polyoxyethylene sorbitan fatty acid ester, a fatty acid alkylolamide and an acetylene glycol derivative (such as Surfynol series, produced by Nissin Chemical Industry Co., Ltd.).

Examples of the anionic surfactant include alkylbenzene sulfonate, alkylnaphthalene sulfonate, a formalin adduct of alkylnaphthalene sulfonate, a higher fatty acid salt, a sulfate of a higher fatty acid ester, a sulfate and a sulfonate of a higher fatty acid ester, a surface and a sulfate of a higher alcohol ether an alkyl carboxylate of higher alkyl sulfonamide, sulfosuccinate and an ester salt thereof, alkyl phosphite, alkyl phosphate, alkyl phosphonate and an ester thereof, and a higher alcohol phosphoric acid ester salt.

Examples of the cationic surfactant include a primary, secondary or tertiary amine salt and a quaternary ammonium salt. Examples of amphoteric surfactant include betain, sulfobetain and sulfate betain.

Other examples of the surfactant include a silicone surfactant, such as a polysiloxane polyoxyethylene adduct, a fluorine surfactant, such as perfluoroalkyl carboxylic acid, perfluoroalkyl sulfonic acid and oxyethylene perfluoroalkyl ether, a natural or bio surfactant, such as lecithin, spiculisporic acid, rhamnolipid, saponin and cholate.

These surfactants may be used solely or as a mixture of two or more kinds of them. The molecular weight of the surfactant is generally from 150 to 1,000. A surfactant having a molecular weight of less than 150 is substantially not present. When the molecular weight exceeds 1,000 but 20,000 or less, it can be used as a water soluble polymer.

In order to control the ink characteristics, the ink in the invention may contain polyethyleneimine, a polyamine, polyvinylpyrrolidone, polyethylene glycol, a cellulose derivative, such as ethyl cellulose and carboxyethyl cellulose, a polysaccharide and a derivative thereof, a water soluble polymer or polymer emulsion, cyclodextrin, a macrocyclic amine, a dendrimer, a crown ether, urea and a derivative thereof, acetamide, trimethylolethane and trimethylolpropane.

The ink in the invention may contain, depending on necessity, an antioxidant, an antifungal agent, an electroconductive agent, an ultraviolet absorbent and a chelating agent. As these additives, all the known materials may be used. Examples of the chelating agent include ethylenediamine tetraacetic acid (EDTA), imino diacetic acid (IDA), ethylenediamine-di(o-hydroxyphenyl acetic acid) (EDDHA), nitriro triacetic acid (NTA), dihydroxyethyl glycine (DHEG), trans-1,2-cyclohexanediamine tetraacetic acid (CyDTA), diethylenetriamine-N,N,N',N",N"-pentaacetic acid (DTPA) and glycol ether diamine-N,N,N',N'-tetraacetic acid (GEDTA).

It is a preferred embodiment that the ink in the invention contains, as a viscosity adjusting agent, methyl cellulose, ethyl cellulose and a derivative thereof, a glycerin and polyglycerin as well as a polyethyleneoxide or polypropyleneoxide adduct thereof, and a polysuccharide and a derivative thereof. Examples of the viscosity adjusting agent include glucose, fructose, mannit, D-sorbit, dextran, xanthan gum, curdlan, cycloamylose, maltitol and derivatives thereof.

The ink in the invention may be adjusted for pH depending on necessity. Examples of a component for adjusting pH include potassium hydroxide, sodium hydroxide, lithium hydroxide, ammonium hydroxide, triethanolamine, diethanolamine, ethanolamine, 2-amino-2-methyl-1-propanol, ammonia, ammonium phosphate, potassium phosphate, sodium phosphate, lithium phosphate, sodium sulfate, an acetate, a lactate, a benzoate, acetic acid, hydrochloric acid, nitric acid, sulfuric acid, phosphoric acid, propionic acid and p-toluenesulfonic acid. An ordinary pH buffering agent may also be used.

While not particularly limited, the pH of the ink in the invention is preferably in a range of about from 3 to 11, and more preferably about from 4.5 to 9.5. In the ink that has an anionic free group on the surface of the pigment, the pH is preferably about from 6 to 11, more preferably about from 6 to 9.5, and particularly preferably about from 7.5 to 9.0. In the ink that has a cationic free group on the surface of the pigment, the pH is preferably about from 4.5 to 8.0, and more preferably about from 4.5 to 7.0.

The ink in the invention preferably has a viscosity of from 1 to 8 mPa.s (cP) at 20° C., and more preferably from 2 to 5 mPa.s (cP). When it exceeds 8 mPa.s (cP), it is not preferred since the ejection may become unstable. When it is less than 1 mPa.s (cP), it is also not preferred since stability in ejection may not be obtained.

Recording and Printing Method

In the ink-jet recording method of the invention, all the methods that are classified into the ink-jet recording method can be applied as the recording and printing method. Examples thereof include a so-called charge controlling method, in which an ink is ejected by utilizing an electrostatic attractive force, a so-called pressure pulse method, in which an ink is ejected by utilizing a vibration pressure of a piezo device, and a so-called thermal ink-jet method, in which ink droplets are formed by utilizing a pressure occurring by forming and growing babbles formed through heating the ink. Among these, the pressure pulse method and the thermal ink-jet method are preferred because a full color image can be provide with a low cost and a small equipment.

The amount of the ink per one droplet to be ejected in the invention is necessarily 20 ng or less, preferably 15 ng or less, and more preferably 5 ng or less. When it exceeds 20 ng, bleeding of an image of a letter or line part suddenly becomes remarkable. In the invention, various demands for ink-jet recording including high image quality, shortening of the drying time and assurance of reliability can be satisfied only by forming droplets of 20 ng or less. The amount of the ink per one droplet to be ejected is preferably 0.5 ng or more, and more preferably 1 ng or more. When it is less than 0.5 ng, it is not preferred since the pigment particles are liable to clog the flow path.

The driving frequency for the ink to be ejected in the invention is preferably from 15 kHz to 40 kHz, and more preferably from 18 kHz to 40 kHz, for attaining stable improvement of the recording speed. When it is less than 15 kHz, it is not preferred since there are some case where increase of the scanning speed of the recording head becomes difficult to prevent increase of the recording speed. When it exceeds 40 kHz, it is also not preferred since there are some cases where the ink cannot be stably ejected from the recording head.

Apparatus for Ink-jet Recording

The apparatus for ink-jet recording according to the invention contains a transporting unit for transporting a recording material, an ink-jet recording head recording an image on the recording material transported by the transporting unit by ejecting an ink at an amount of the ink of 20 ng or less per one droplet, and an image signal input unit for inputting an image signal to the ink-jet recording head, and the ink used herein is the foregoing ink for ink-jet recording used for the ink-jet recording method of the invention. The preferred ranges for the amount of the ink per one droplet and other preferred conditions are the same as those described for the ink-jet recording method of the invention.

As the transporting unit, the ink-jet recording head and the image signal input unit of the apparatus for ink-jet recording according to the invention, all those having been known may be employed, and the effect of the invention can be exerted when the conditions of the invention are satisfied in any case. In other words, good printing quality can be obtained in any type of apparatuses that are classified into the so-called ink-jet recording apparatus.

Such an ink-jet recording apparatus can be used that has a function in that a recording material and an ink are heated to a temperature of from 50° C. to 200° C. upon printing or before and after printing to accelerate fixing of the printed image. In addition to the method where printing is carried out directly on plain paper, glazed paper, special paper, cloth, a film or an OHP sheet, such a method can be employed that an image is once printed on an intermediate medium, such as an intermediate drum or belt, and after conditioning the ink image on the intermediate medium, the image is then recorded by transferring on paper, cloth or a film.

The invention can also applied to a so-called two-fluid ink-jet recording method, in which a colorless or hypochromic ink is used in addition to the ink used in the invention and is mixed with the ink used in the invention on paper.

Function

In the invention, an ink for ink-jet recording containing at least, as essential components, a pigment self-dispersible in water, a water soluble organic solvent and water, and satisfying the following conditions (a) to (c) is printed with an amount of the ink per one droplet of 20 ng or less:

(a) a dynamic contact angle upon dropping 4 $\mu$L of the ink for ink-jet recording on plain paper is about 60° or less after one second from dropping;

(b) a volume average particle diameter mv of dispersed particles of the pigment in the ink for ink-jet recording is about from 150 nm to 250 nm; and (c) in the dispersed particles of the pigment in the ink for ink-jet recording, a number of particles having a particle diameter of from 0.5 $\mu$m to 5 $\mu$m is about from $25 \times 10^4$ to $2,000 \times 10^4$ per microliter, and a number of particles having a particle diameter of 5 $\mu$m or more is about 100 per microliter or less. According to the constitution, such an image can be obtained that is excellent in drying property on plain paper, has a sufficient optical density on plain paper, suffers less fluctuation in optical density depending on paper, has sufficient water resistance and light resistance, and suffers less bleeding at an edge part of a letter, a line and a solid image, and is excellent in fixing property.

The mechanisms by which the effects of the invention can be attained are not completely clear, and the following factors can be considered.

In the case where a pigment is used as a colorant, when the colorant concentration in an ink is increased, an optical density is increased on particular kinds of paper, but no sufficient optical density is obtained depending on the kind of paper. In the case of the ink using the self-dispersible pigment satisfying the conditions of the invention, even on the paper on which no sufficient density can be obtained, the dispersed particles of the pigment have the foregoing volume average particle size distribution and the foregoing number of particles having a particle diameter of from 0.5 $\mu$m to 5 $\mu$m, and thus the dispersed particles are appropriately aggregated on paper with the particles having a particle diameter of from 0.5 $\mu$m to 5 $\mu$m as nuclei under the balance of the particle size distribution, whereby an image having a high density can be realized with less fluctuation depending on paper.

In the case of the ink satisfying the conditions of the invention, because aggregation and penetration of the colorant are well balanced, a sufficient optical density can be obtained on paper while the amount of the colorant is suppressed, whereby the fixing property is improved.

The invention will be described specifically with reference to the following examples.

EXAMPLE 1

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 8 parts by mass. The components are mixed and agitated, and then passed through a filter of 5 $\mu$m, so as to obtain an ink for ink-jet recording having the following composition.

| | |
|---|---|
| Carbon black (CW-2, produced by Orient Chemical Co., Ltd.) | 8 parts by mass (as a pigment content) |
| Glycerin | 12 parts by mass |
| Sulfolan | 10 parts by mass |
| Urea | 4 parts by mass |
| Nonionic surfactant (Surfynol 465, produced by Nissin Chemical Industry Co., Ltd.) | 2.5 parts by mass |
| Nonionic surfactant (E-230, produced by NOF Corp.) | 0.5 part by mass |
| Ion exchanged water | balance |

In Example 1, the ink amount per one droplet is 4 ng upon printing in the evaluation test described later.

EXAMPLE 2

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 11 parts by mass. The components are mixed and agitated, and then passed through a filter of 5 $\mu$m, so as to obtain an ink for ink-jet recording having the following composition.

| | |
|---|---|
| Carbon black (CW-2, produced by Orient Chemical Co., Ltd.) | 11 parts by mass (as a pigment content) |
| Ethylene glycol | 10 parts by mass |
| Sulfolan | 7 parts by mass |
| Pyrrolidone | 4 parts by mass |
| Urea | 4 parts by mass |
| Nonionic surfactant (Surfynol 440, produced by Nissin Chemical Industry Co., Ltd.) | 2.0 parts by mass |
| Nonionic surfactant (E-230, produced by NOF Corp.) | 0.5 part by mass |
| Ion exchanged water | balance |

In Example 2, the ink amount per one droplet is 5 ng upon printing in the evaluation test described later.

EXAMPLE 3

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 12 parts by mass. The components are mixed and agitated, and then passed through a filter of 5 μm, so as to obtain an ink for ink-jet recording having the following composition.

| | |
|---|---|
| Carbon black (CW-2, produced by Orient Chemical Co., Ltd.) | 6 parts by mass (as a pigment content) |
| Diethylene glycol | 20 parts by mass |
| Sulfolan | 5 parts by mass |
| Butylcarbitol | 3 parts by mass |
| Urea | 4 parts by mass |
| Nonionic surfactant (Surfynol 440, produced by Nissin Chemical Industry Co., Ltd.) | 0.6 part by mass |
| Nonionic surfactant (EH-4, produced by Aoki Oil Industrial Co., Ltd.) | 0.5 part by mass |
| Ion exchanged water | balance |

In Example 3, the ink amount per one droplet is 3 ng upon printing in the evaluation test described later.

EXAMPLE 4

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 8 parts by mass. The components are mixed and agitated, and then passed through a filter of 10 μm, so as to obtain an ink for ink-jet recording having the following composition.

| | |
|---|---|
| Carbon black (CW-2, produced by Orient Chemical Co., Ltd.) | 8 parts by mass (as a pigment content) |
| Glycerin | 14 parts by mass |
| Sulfolan | 7 parts by mass |
| Urea | 4 parts by mass |
| Nonionic surfactant (Surfynol 104, produced by Nissin Chemical Industry Co., Ltd.) | 0.2 part by mass |
| Ion exchanged water | balance |

In Example 4, the ink amount per one droplet is 5 ng upon printing in the evaluation test described later.

EXAMPLE 5

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 8 parts by mass. The components are mixed and agitated, and then passed through a filter of 5 μm, so as to obtain an ink for ink-jet recording having the following composition.

| | |
|---|---|
| Carbon black (CW-2, produced by Orient Chemical Co., Ltd.) | 8 parts by mass (as a pigment content) |
| Glycerin | 12 parts by mass |
| Sulfolan | 9 parts by mass |
| Urea | 4 parts by mass |
| Nonionic surfactant (EH-4, produced by Aoki Oil Industrial Co., Ltd.) | 1.3 parts by mass |
| Nonionic surfactant (E-215, produced by NOF Corp.) | 1.5 parts by mass |
| Potassium chloride | 0.3 part by mass |
| Ion exchanged water | balance |

In Example 5, the ink amount per one droplet is 6 ng upon printing in the evaluation test described later.

EXAMPLE 6

A dispersion of carbon black self-dispersible in water CW-2 (self-dispersibility index: 100%, produced by Orient Chemical Co., Ltd.) is subjected to a centrifugal separation treatment (at 8,000 rpm for 10 minutes) in a centrifugal separator, and a residual part (20% by mass of the total amount) is removed to prepare a pigment dispersion.

To the pigment dispersion, appropriate amounts of the following components including water soluble organic solvents, surfactants and ion exchanged water are added to make a total amount of 100 parts by mass and a pigment concentration of 8 parts by mass. The components are mixed and agitated, and then passed through a filter of 5 μm, so as to obtain an ink for ink-jet recording having the following composition.

| | |
|---|---|
| Carbon black (CW-2, produced by Orient Chemical Co., Ltd.) | 8 parts by mass (as a pigment content) |
| Glycerin | 15 parts by mass |
| Sulfolan | 6 parts by mass |
| Urea | 4 parts by mass |
| Nonionic surfactant (EH-4, produced by Aoki Oil Industrial Co., Ltd.) | 1.3 parts by mass |

| | |
|---|---|
| Nonionic surfactant (E-215, produced by NOF Corp.) | 1.5 parts by mass |
| Ion exchanged water | balance |

In Example 6, the ink amount per one droplet is 5 ng upon printing in the evaluation test described later.

EXAMPLE 7

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 6 parts by mass. The components are mixed and agitated, and then passed through a filter of 10 μm, so as to obtain an ink for ink-jet recording having the following composition.

| | |
|---|---|
| Carbon black (CW-2, produced by Orient Chemical Co., Ltd.) | 6 parts by mass (as a pigment content) |
| C.I. Food Black 2 (dye) | 2 parts by mass |
| Glycerin | 10 parts by mass |
| Sulfolan | 7 parts by mass |
| Urea | 4 parts by mass |
| Nonionic surfactant (Surfynol 104, produced by Nissin Chemical Industry Co., Ltd.) | 0.2 part by mass |
| Ion exchanged water | balance |

In Example 7, the ink amount per one droplet is 5 ng upon printing in the evaluation test described later.

EXAMPLE 8

An ink having the same composition as in Example 1 is obtained in the same manner as in Example 1.

In Example 8, the ink amount per one droplet is 16 ng upon printing in the evaluation test described later.

Comparative Example 1

The following components including dye, water soluble organic solvents, surfactants and ion exchanged water are mixed to make a total amount of 100 parts by mass and a dye concentration of 2.9 parts by mass, so as to obtain an ink for ink-jet recording having the following composition.

| | |
|---|---|
| C.I. Direct Black 168 (dye) | 2.9 parts by mass |
| Glycerin | 10 parts by mass |
| Isopropyl alcohol | 3 parts by mass |
| Sulfolan | 10 parts by mass |
| Urea | 5 parts by mass |
| Nonionic surfactant (Surfynol 440, produced by Nissin Chemical Industry Co., Ltd.) | 1.0 part by mass |
| Ion exchanged water | balance |

In Comparative Example 1, the ink amount per one droplet is 5 ng upon printing in the evaluation test described later.

Comparative Example 2

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 2.9 parts by mass. The components are mixed and agitated, and then passed through a filter of 5 μm, so as to obtain an ink for ink-jet recording having the following composition.

| | |
|---|---|
| Carbon black (CW-2, produced by Orient Chemical Co., Ltd.) | 2.9 parts by mass (as a pigment content) |
| Glycerin | 10 parts by mass |
| Sulfolan | 10 parts by mass |
| Urea | 4 parts by mass |
| Nonionic surfactant (Surfynol 465, produced by Nissin Chemical Industry Co., Ltd.) | 2.5 parts by mass |
| Nonionic surfactant (E-230, produced by NOF Corp.) | 0.5 part by mass |
| Ion exchanged water | balance |

In Comparative Example 2, the ink amount per one droplet is 4 ng upon printing in the evaluation test described later.

Comparative Example 3

The following components including dye, water soluble organic solvents, surfactants and ion exchanged water are mixed to make a total amount of 100 parts by mass and a dye concentration of 9 parts by mass, so as to obtain an ink for ink-jet recording having the following composition.

| | |
|---|---|
| C.I. Direct Black 168 (dye) | 9 parts by mass |
| Glycerin | 10 parts by mass |
| Isopropyl alcohol | 3 parts by mass |
| Sulfolan | 10 parts by mass |
| Urea | 5 parts by mass |
| Nonionic surfactant (EH-4, produced by Aoki Oil Industrial Co., Ltd.) | 1.3 parts by mass |
| Nonionic surfactant (E-215, produced by NOF Corp.) | 1.5 parts by mass |
| Ion exchanged water | balance |

In Comparative Example 3, the ink amount per one droplet is 4 ng upon printing in the evaluation test described later.

Comparative Example 4

10 parts by mass of carbon black Raven 5250 (self-dispersibility index: 35%, produced by Columbian Chemical Company), 2 parts by mass of a polymer dispersant (an n-butyl methacrylate-sodium methacrylate copolymer) and an appropriate amount of water are mixed, and a dispersion is obtained by using an ultrasonic homogenizer. The dispersion is subjected to a centrifugal separation treatment (at 8,000 rpm for 10 minutes) in a centrifugal separator, and a residual part (20% by mass of the total amount) is removed to prepare a pigment dispersion.

To the pigment dispersion, appropriate amounts of the following components including water soluble organic solvents, surfactants and ion exchanged water are added to make a total amount of 100 parts by mass and a pigment concentration of 8 parts by mass. The components are mixed and agitated, and then passed through a filter of 5 μm, so as to obtain an ink for ink-jet recording having the following composition.

| | |
|---|---|
| Carbon dispersion | 8 parts by mass (as a carbon solid content) |
| Glycerin | 10 parts by mass |
| Isopropyl alcohol | 3 parts by mass |
| Sulfolan | 10 parts by mass |
| Urea | 5 parts by mass |
| Nonionic surfactant (Surfynol 465, produced by Nissin Chemical Industry Co., Ltd.) | 2.5 parts by mass |
| Ion exchanged water | balance |

In Comparative Example 4, the ink amount per one droplet is 5 ng upon printing in the evaluation test described later.

Comparative Example 5

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 10 parts by mass. The components are mixed and agitated, and then passed through a filter of 10 μm, so as to obtain an ink for ink-jet recording having the following composition.

| | |
|---|---|
| Carbon black (CW-2, produced by Orient Chemical Co., Ltd.) | 10 parts by mass (as a pigment content) |
| Diethylene glycol | 15 parts by mass |
| Sulfolan | 10 parts by mass |
| Urea | 4 parts by mass |
| Nonionic surfactant (Surfynol 465, produced by Nissin Chemical Industry Co., Ltd.) | 2.5 parts by mass |
| Nonionic surfactant (E-230, produced by NOF Corp.) | 0.5 part by mass |
| Calcium nitrate | 0.002 part by mass |
| Ion exchanged water | balance |

In Comparative Example 5, the ink amount per one droplet is 5 ng upon printing in the evaluation test described later.

Comparative Example 6

To a dispersion of carbon black self-dispersible in water Cab-O-Jet 300 (self-dispersibility index: 100%, produced by Cabot Oil & Gas Corp.), appropriate amounts of the following components including water soluble organic solvents, surfactants and ion exchanged water are added to make a total amount of 100 parts by mass and a pigment concentration of 10 parts by mass. The components are mixed and agitated, and then passed through a filter of 5 μm, so as to obtain an ink for ink-jet recording having the following composition.

| | |
|---|---|
| Carbon black (Cab-O-Jet 300, produced by Cabot Oil & Gas Corp.) | 10 parts by mass (as a pigment content) |
| Ethylene glycol | 15 parts by mass |
| Propylene glycol | 10 parts by mass |
| Urea | 4 parts by mass |
| Nonionic surfactant (Surfynol 465, produced by Nissin Chemical Industry Co., Ltd.) | 2.5 parts by mass |
| Nonionic surfactant (E-230, produced by NOF Corp.) | 0.5 part by mass |
| Ion exchanged water | balance |

In Comparative Example 6, the ink amount per one droplet is 4 ng upon printing in the evaluation test described later.

Comparative Example 7

To a dispersion of carbon black self-dispersible in water Cab-O-Jet 300 (self-dispersibility index: 100%, produced by Cabot Oil & Gas Corp.), appropriate amounts of the following components including water soluble organic solvents, surfactants and ion exchanged water are added to make a total amount of 100 parts by mass and a pigment concentration of 10 parts by mass. The components are mixed and agitated, and then passed through a filter of 5 μm, so as to obtain an ink for ink-jet recording having the following composition.

| | |
|---|---|
| Carbon black (Cab-O-Jet 300, produced by Cabot Oil & Gas Corp.) | 10 parts by mass (as a pigment content) |
| Ethylene glycol | 15 parts by mass |
| Propylene glycol | 10 parts by mass |
| Urea | 4 parts by mass |
| Nonionic surfactant (Surfynol 465, produced by Nissin Chemical Industry Co., Ltd.) | 2.5 parts by mass |
| Nonionic surfactant (E-230, produced by NOF Corp.) | 0.5 part by mass |
| Potassium chloride | 0.2 part by mass |
| Ion exchanged water | balance |

In Comparative Example 7, the ink amount per one droplet is 5 ng upon printing in the evaluation test described later.

Comparative Example 8

A dispersion of carbon black self-dispersible in water Cab-O-Jet 300 (self-dispersibility index: 100%, produced by Cabot Oil & Gas Corp.) is subjected to a centrifugal separation treatment (at 8,000 rpm for 30 minutes) in a centrifugal separator, and a residual part (20% by mass of the total amount) is removed to prepare a pigment dispersion.

To the pigment dispersion, appropriate amounts of the following components including water soluble organic solvents, surfactants and ion exchanged water are added to make a total amount of 100 parts by mass and a pigment concentration of 10 parts by mass. The components are mixed and agitated, and then passed through a filter of 5 μm, so as to obtain an ink for ink-jet recording having the following composition.

| | |
|---|---|
| Carbon black (Cab-O-Jet 300, produced by Cabot Oil & Gas Corp.) | 10 parts by mass (as a pigment content) |
| Diethylene glycol | 20 parts by mass |
| Butylcarbitol | 5 parts by mass |

-continued

| | |
|---|---|
| Urea | 4 parts by mass |
| Nonionic surfactant (E-230, produced by NOF Corp.) | 0.5 part by mass |
| Ion exchanged water | balance |

In Comparative Example 8, the ink amount per one droplet is 4 ng upon printing in the evaluation test described later.

Comparative Example 9

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 8 parts by mass. The components are mixed and agitated to obtain an ink for ink-jet recording having the following composition.

| | |
|---|---|
| Carbon black (CW-2, produced by Orient Chemical Co., Ltd.) | 8 parts by mass (as a pigment content) |
| Butylcarbitol | 4.5 parts by mass |
| Diethylene glycol | 15 parts by mass |
| Urea | 4 parts by mass |
| Nonionic surfactant (Surfynol 465, produced by Nissin Chemical Industry Co., Ltd.) | 0.5 part by mass |
| Ion exchanged water | balance |

In Comparative Example 9, the ink amount per one droplet is 4 ng upon printing in the evaluation test described later.

Comparative Example 10

An ink having the same composition as in Example 1 is obtained in the same manner as in Example 1.

In Comparative Example 10, the ink amount per one droplet is 21 ng upon printing in the evaluation test described later.

Comparative Example 11

To a dispersion of carbon black self-dispersible in water CW-2 (self-dispersibility index: 100%, produced by Orient Chemical Co., Ltd.), appropriate amounts of the following components including water soluble organic solvents, surfactants and ion exchanged water are added to make a total amount of 100 parts by mass and a pigment concentration of 9 parts by mass. The components are mixed and agitated, and then passed through a filter of 5 $\mu$m, so as to obtain an ink for ink-jet recording having the following composition.

| | |
|---|---|
| Carbon black (CW-2, produced by Orient Chemical Co., Ltd.) | 9 parts by mass (as a pigment content) |
| Glycerin | 10 parts by mass |
| Sulfolan | 10 parts by mass |
| Urea | 4 parts by mass |
| Nonionic surfactant (E-215, produced by NOF Corp.) | 0.7 part by mass |
| Ion exchanged water | balance |

In Comparative Example 11, the ink amount per one droplet is 4 ng upon printing in the evaluation test described later.

Confirmation of Dynamic Contact Angle and Dispersed State of Dispersed Particles of Pigment for Respective Inks for Ink-jet Recording The dynamic contact angle and the dispersed state of the dispersed particles of the pigment are confirmed for the respective inks for ink-jet recording of Examples 1 to 8 and Comparative Examples 1 to 11 according to the manners described in the foregoing. The results are shown in Tables 1 and 2 below.

TABLE 1

| | Dynamic contact angle after 1 second (°) | Pigment concentration (% by mass) | Volume average particle diameter mv (nm) | Number average particle diameter mn (nm) |
|---|---|---|---|---|
| Example 1 | 32 | 8 | 162 | 104 |
| Example 2 | 36 | 11 | 169 | 90 |
| Example 3 | 35 | 6 | 173 | 110 |
| Example 4 | 28 | 8 | 203 | 118 |
| Example 5 | 48 | 7 | 188 | 132 |
| Example 6 | 31 | 8 | 159 | 92 |
| Example 7 | 35 | 6 (*1) | 165 | 98 |
| Example 8 | 32 | 8 | 162 | 104 |

| | Particle size distribution mV/mn | Number of particles of 0.5–5 $\mu$m ($\times 10^4$ per $\mu$L) | Number of particles of 5 $\mu$m or more ($\times 10^4$ per $\mu$L) | Amount of ink per one droplet (ng) |
|---|---|---|---|---|
| Example 1 | 1.56 | 210 | 5 | 4 |
| Example 2 | 1.88 | 370 | 10 | 5 |
| Example 3 | 1.57 | 450 | 7 | 3 |
| Example 4 | 1.72 | 550 | 2 | 5 |
| Example 5 | 1.42 | 1,100 | 18 | 6 |
| Example 6 | 1.73 | 26 | 5 | 5 |
| Example 7 | 1.68 | 180 | 9 | 5 |
| Example 8 | 1.65 | 210 | 5 | 12 |

Note: (*1) further containing 2% by mass of dye

TABLE 2

| | Dynamic contact angle after 1 second (°) | Pigment (or dye) concentration (% by mass) | Volume average particle diameter mv (nm) | Number average particle diameter mn (nm) |
|---|---|---|---|---|
| Comparative Example 1 | 45 | 2.9(*2) | — | — |
| Comparative Example 2 | 30 | 2.9 | 159 | 98 |
| Comparative Example 3 | 31 | 9 (*2) | — | — |
| Comparative Example 4 | 35 | 8 | 149 | 85 |
| Comparative Example 5 | 36 | 10 | 280 | 148 |
| Comparative Example 6 | 41 | 9 | 118 | 81 |

TABLE 2-continued

| | | | |
|---|---|---|---|
| Comparative Example 7 | 38 | 10 | 181 | 99 |
| Comparative Example 8 | 40 | 8 | 161 | 81 |
| Comparative Example 9 | 48 | 8 | 180 | 91 |
| Comparative Example 10 | 32 | 8 | 162 | 104 |
| Comparative Example 11 | 62 | 9 | 181 | 92 |

| | Particle size distribution mv/mn | Number of particles of 0.5–5 μm (×10$^4$ per μL) | Number of particles of 5 μm or more (×10$^4$ per μL) | Amount of ink per one droplet (ng) |
|---|---|---|---|---|
| Comparative Example 1 | — | — | — | 5 |
| Comparative Example 2 | 1.62 | 90 | 3 | 4 |
| Comparative Example 3 | — | — | — | 4 |
| Comparative Example 4 | 1.75 | 1,580 | 15 | 5 |
| Comparative Example 5 | 1.89 | 1,620 | 81 | 5 |
| Comparative Example 6 | 1.46 | 35 | 7 | 4 |
| Comparative Example 7 | 1.83 | 3,100 | 51 | 5 |
| Comparative Example 8 | 1.99 | 10 | 10 | 4 |
| Comparative Example 9 | 1.98 | 180 | 121 | 4 |
| Comparative Example 10 | 1.56 | 210 | 5 | 16 |
| Comparative Example 11 | 1.97 | 270 | 21 | 4 |

Note: (*2) dye concentration

Evaluation Methods

As a printing equipment, an experimental ink-jet recording apparatus having an experimental printing head of the thermal ink-jet method of 800 dpi and 300 nozzles with a printing driving frequency of 18 kHz is used.

As recording materials, paper sets of FX-L Paper, Multiace Paper, P Paper (all produced by Fuji Xerox Co., Ltd.), 4200DP Paper and 4024 Paper (all produced by Xerox Corp.) are used.

The printing and the evaluation are carried out under the normal environment (temperature: 23±0.5° C., humidity: 55±5%RH).

Evaluation tests of the printing density of a 100% solid image, the line bleeding, the drying time of a 100% solid image and the fixing property are carried out by printing a 100% coverage pattern and a line pattern formed with two dots on the same paper.

The evaluation tests will be described in detail below.

Printing Density of 100% Solid Image

A 100% coverage pattern is printed on all kinds of paper by using the experimental ink-jet recording apparatus and then allowed to stand under the normal environment for 24 hours. The printing density is evaluated by using the 100% coverage pattern. The printing density is measured by using X-Rite 404 (produced by X-Rite Inc.). The evaluation standard is as follows:

A: The optical density is 1.35 or more for all the kinds of paper sets.
B: The optical density is from 1.1 to 1.35 in some kinds of the paper sets.
C: The optical density is less than 1.1 in at least one kind of the paper sets.

Line Bleeding

A line pattern is printed on Multiace Paper by using the experimental ink-jet recording apparatus and then allowed to stand under the normal environment for 24 hours. The line bleeding is evaluated by using the line pattern. The evaluation standard for the line bleeding is as follows:

A: Bleeding is not remarkable.
B: Bleeding is somewhat remarkable.
C: Bleeding is remarkable.

Drying Time of 100% Solid Image

The drying time of a 100% solid image (drying time) is measured in the following manner. A 100% solid image is printed on Multiace Paper by using the experimental ink-jet recording apparatus. Another Multiace Paper is superposed on the solid image part, and a load of $1.9 \times 10^4$ N/m$^2$ is applied thereon. The time after the printing required that the ink is no longer transferred to the superposed Multiace Paper is measured and designated as the drying time. Samples having a drying time of less than 5 seconds are evaluated for the grade A, and those having a drying time of 5 seconds or more are evaluated for the grade C.

Clogging of Nozzles

The clogging of nozzles is evaluated in the following manner. A 100% coverage pattern (9 mm×10 cm) is printed on Multiace Paper by using the experimental ink-jet recording apparatus, and the apparatus is then allowed to stand. After 30 seconds, another solid image pattern (9 mm×10 cm) is printed on another position of the same paper, and disturbance at the front edge of the solid image is observed with the naked eye. The evaluation standard for the clogging of nozzles is as follows:

A: No disturbance is observed.
B: Disturbance is somewhat observed.
C: Severe disturbance is observed.

Water Resistance

A 100% coverage pattern (9 mm×10 cm) is printed on Multiace Paper by using the experimental ink-jet recording apparatus, and the optical density of the printed part is measured. Thereafter, the paper is immersed in deionized water under a normal temperature environment for 3 minutes and then dried in the air. The optical density of the 100% coverage pattern after drying is measured to evaluate the water resistance. The printing density is measured by using X-Rite 404 (produced by X-Rite Inc.). The evaluation standard is as follows:

A: The optical density after immersing in deionized water for 3 minutes is 95% or more of that before the immersion.
B: The optical density after immersing in deionized water for 3 minutes is 80% or more and less than 95% of that before the immersion.
C: The optical density after immersing in deionized water for 3 minutes is less than 80% of that before the immersion.

Light Resistance

A 100% coverage pattern (9 mm×10 cm) is printed on Multiace Paper by using the experimental ink-jet recording apparatus, and the optical density of the printed part is measured. Thereafter, the paper is irradiated with light of 560 W/m$^2$ for 8 hours by using Suntest CPS+ (produced by Atlas Electric Devices Company) to carry out a light resistance test. The optical density of the 100% coverage pattern after the light resistance test is measured to evaluate the light resistance. The printing density is measured by using X-Rite 404 (produced by X-Rite Inc.). The evaluation standard is as follows:

A: The optical density after the light resistance test is 95% or more of that before the test.

B: The optical density after the light resistance test is 80% or more and less than 95% of that before the test.

C: The optical density after the light resistance test is less than 80% of that before the test.

Fixing Property

A 100% coverage pattern is printed on Multiace Paper by using the experimental ink-jet recording apparatus and then allowed to stand under the normal environment for 24 hours. The fixing property is evaluated by using the 100% coverage pattern. The evaluation of the fixing property of an image is evaluated in the following manner. Another blank Multiace Paper is superposed on the solid image printed part, and a load of $4.9 \times 10^4$ N/m$^2$ is applied thereon. An ink transferred to the superposed blank Multiace Paper is evaluated by sensory analysis. The evaluation standard for the fixing property is as follows:

A: Substantially no transfer is observed.

B: Transfer is somewhat observed.

C: Severe transfer is observed.

Fluctuation in Optical Density Depending on Paper

The fluctuation in optical density depending on paper is evaluated in the following manner. The same 100% coverage patterns are printed on all the paper sets, and the difference between the maximum printing density and the minimum printing density among the paper sets is measured. The evaluation standard for the fluctuation in optical density depending on paper is as follows:

A: The difference between the paper set exhibiting the maximum printing density and the paper set exhibiting the minimum printing density is less than 0.15.

B: The difference between the paper set exhibiting the maximum printing density and the paper set exhibiting the minimum printing density is 0.15 or more and less than 0.3.

C: The difference between the paper set exhibiting the maximum printing density and the paper set exhibiting the minimum printing density is 0.3 or more.

The results obtained for the respective evaluation items are shown in Tables 3 and 4.

TABLE 3

|  | Printing density of 100% solid image | Line bleeding | Drying time of 100% solid image | Clogging of nozzles |
|---|---|---|---|---|
| Example 1 | A | A | A | A |
| Example 2 | A | A | A | B |
| Example 3 | B | A | A | A |
| Example 4 | A | A | A | B |
| Example 5 | A | A | A | B |
| Example 6 | B | A | A | A |
| Example 7 | A | A | A | A |
| Example 8 | A | B | A | A |

|  | Water resistance | Light resistance | Fixing property | Fluctuation in optical density depending on paper |
|---|---|---|---|---|
| Example 1 | A | A | A | A |
| Example 2 | A | A | B | A |
| Example 3 | A | A | A | B |
| Example 4 | A | A | A | A |
| Example 5 | A | A | A | A |
| Example 6 | A | A | A | B |

TABLE 3-continued

| Example 7 | B | B | A | A |
|---|---|---|---|---|
| Example 8 | A | A | A | A |

TABLE 4

|  | Printing density of 100% solid image | Line bleeding | Drying time of 100% solid image | Clogging of nozzles |
|---|---|---|---|---|
| Comparative Example 1 | C | B | A | A |
| Comparative Example 2 | C | A | A | A |
| Comparative Example 3 | A | B | A | A |
| Comparative Example 4 | B | B | A | C |
| Comparative Example 5 | A | A | A | C |
| Comparative Example 6 | B | A | A | B |
| Comparative Example 7 | A | A | A | C |
| Comparative Example 8 | B | A | A | A |
| Comparative Example 9 | A | A | A | C |
| Comparative Example 10 | A | C | A | A |
| Comparative Example 11 | A | A | C | A |

|  | Water resistance | Light resistance | Fixing property | Fluctuation in optical density depending on paper |
|---|---|---|---|---|
| Comparative Example 1 | C | C | A | A |
| Comparative Example 2 | A | A | A | C |
| Comparative Example 3 | C | C | A | A |
| Comparative Example 4 | A | A | A | C |
| Comparative Example 5 | A | A | B | A |
| Comparative Example 6 | A | A | A | C |
| Comparative Example 7 | A | A | A | A |
| Comparative Example 8 | A | A | A | C |
| Comparative Example 9 | A | A | A | A |
| Comparative Example 10 | A | A | A | A |
| Comparative Example 11 | A | A | C | C |

As described in the foregoing, according to the invention, an ink-jet recording method and an apparatus for ink-jet recording can be provided in that bleeding at an edge part does not occur, sufficient water resistance and light resistance are attained, an image that is excellent in fixing property and has small fluctuation in optical density depending on paper can be obtained, and by using an ink for ink-jet recording that is difficult to cause clogging due to drying of the ink for ink-jet recording at a tip end of a nozzle, various characteristics that are demanded in a resulting recorded image are balanced on a higher level.

The entire disclosure of Japanese Patent Application No. 2001-138266 filed on May 9, 2001 including specification, claims and abstract is incorporated herein by reference in its entirety.

What is claimed is:

1. An ink-jet recording method using an ink for ink-jet recording comprising at least, as essential components, a pigment self-dispersible in water, a water soluble organic solvent and water, and carrying out printing with an amount of the ink of 20 ng or less per one droplet, the ink for ink-jet recording satisfying the following conditions (a) to (c):
   (a) a dynamic contact angle upon dropping 4 µL of the ink for ink-jet recording on plain paper is about 60° or less after one second from dropping;
   (b) a volume average particle diameter of dispersed particles of the pigment in the ink for ink-jet recording is about from 150 nm to 250 nm; and
   (c) in the dispersed particles of the pigment in the ink for ink-jet recording, a number of particles having a particle diameter of from 0.5 µm to 5 µm is about from $25 \times 10^4$ to $2,000 \times 10^4$ per microlitter, and a number of particles having a particle diameter of 5 µm or more is about 100 per microlitter or less.

2. The ink-jet recording method as claimed in claim 1, wherein the dynamic contact angle upon dropping 4 µL of the ink for ink-jet recording on plain paper is about 50° or less after one second from dropping.

3. The ink-jet recording method as claimed in claim 1, wherein a concentration of the pigment in the ink for ink-jet recording is about from 3% to 20% by mass.

4. The ink-jet recording method as claimed in claim 1, wherein a ratio of the volume average particle diameter to a number average particle diameter of the dispersed particles of the pigment in the ink for ink-jet recording is about 3.2 or less.

5. The ink-jet recording method as claimed in claim 1, wherein printing of droplets of the ink is carried out at a driving frequency of about 15 KHz or more.

6. The ink-jet recording method as claimed in claim 1, wherein the ink for ink-jet recording further contains a nonionic surfactant.

7. The ink-jet recording method as claimed in claim 1, wherein the ink for ink-jet recording further contains a dye.

8. The ink jet recording method of claim 1 wherein printing of droplets of ink is carried out with an amount of ink of less than 10 ng per one droplet.

9. The ink jet recording method of claim 1 wherein the ink comprises a dynamic contact angle of less than 30 degrees after one second from dropping 4 µL of the ink.

10. The ink jet recording of method of claim 1 wherein printing of droplets of the ink is carried out at a drive frequency of more than 18 KHz.

11. An apparatus for ink-jet recording comprising a transporting unit that transports a recording material, an ink-jet recording head that records an image on the recording material transported by the transporting unit by ejecting an ink at an amount of the ink of 20 ng or less per one droplet, and an image signal input unit that inputs an image signal to the ink-jet recording head, the ink comprising at least, as essential components, a pigment self-dispersible in water, a water soluble organic solvent and water, and satisfying the following conditions (a) to (c):
   (a) a dynamic contact angle upon dropping 4 µL of the ink for ink-jet recording on plain paper is about 60° or less after one second from dropping;
   (b) a volume average particle diameter of dispersed particles of the pigment in the ink for ink-jet recording is about from 150 nm to 250 nm; and
   (c) in the dispersed particles of the pigment in the ink for ink-jet recording, a number of particles having a particle diameter of from 0.5 µm to 5 µm is about from $25 \times 10^4$ to $2,000 \times 10^4$ per microlitter, and a number of particles having a particle diameter of 5 µm or more is about 100 per microlitter or less.

12. The apparatus for ink-jet recording as claimed in claim 11, wherein the dynamic contact angle upon dropping 4 µL of the ink for ink-jet recording on plain paper is about 50° or less after one second from dropping.

13. The apparatus for ink-jet recording as claimed in claim 11, wherein a concentration of the pigment in the ink for ink-jet recording is about from 3% to 20% by mass.

14. The apparatus for ink-jet recording as claimed in claim 11, wherein a ratio of the volume average particle diameter to a number average particle diameter of the dispersed particles of the pigment in the ink for ink-jet recording is about 3.2 or less.

15. The apparatus for ink-jet recording as claimed in claim 11, wherein printing of droplets of the ink is carried out at a driving frequency of about 15 KHz or more.

16. The apparatus for ink-jet recording as claimed in claim 11, wherein the ink for ink-jet recording further contains a nonionic surfactant.

17. The apparatus for ink-jet recording as claimed in claim 11, wherein the ink for ink-jet recording further contains a dye.

18. The apparatus for ink jet recording of claim 11 wherein printing of droplets of ink is carried out with an amount of ink of less than 10 ng per one droplet.

19. The apparatus for ink jet recording of claim 11 wherein the ink comprises a dynamic contact angle of less than 30 degrees after one second from dropping 4 µL of the ink.

20. The apparatus for ink jet recording of claim 11 wherein printing of droplets of the ink is carried out at a drive frequency of more than 18 KHz.

21. An ink for an ink-jet printer, the ink comprising:
   water;
   a water soluble organic solvent; and
   a pigment, self-dispersible in water and having particles, wherein the particles include:
      a volume average diameter of the particles within a range of about 150 to 250 nm,
      a concentration of the particles having a diameter of from 0.5 µm to 5 µm within a range of about $25 \times 10^4$ to $2,000 \times 10^4$ particles per micro-liter, and
      a concentration of the particles having a diameter of 5 µm or greater of no more than about 100 particles per micro-liter;
   wherein, upon dropping 4 µL of the ink on plain paper, the ink has a dynamic contact angle of no more than about 60° after one second from the dropping.

22. The ink of claim 21 wherein the ink has a dynamic contact angle of no more than about 50° after one second from the dropping.

23. The ink of claim 21 wherein concentration of the pigment in the ink is about from 3% to 20% by mass.

24. The ink of claim 21 wherein a ratio of the volume average particle diameter to the number average particle diameter of the particles in the pigment is about 3.2 or less.

25. The ink of claim 21 wherein the ink comprises a dynamic contact angle of less than 30 degrees after one second from dropping 4 µL of the ink.

* * * * *